United States Patent Office 3,649,719
Patented Mar. 14, 1972

3,649,719
PHOSPHORIC ACID ESTER AMIDOHALIDES
Jean-Pierre Leber, Basel, Switzerland, assignor to Sandoz Ltd. (also known as Sandoz AG), Basel, Switzerland
No Drawing. Continuation-in-part of application Ser. No. 829,747, June 2, 1969. This application May 1, 1970, Ser. No. 33,862
Claims priority, application Switzerland, May 5, 1969, 6,836/69
Int. Cl. C07f 9/24, 9/26
U.S. Cl. 260—941
17 Claims

ABSTRACT OF THE DISCLOSURE

The invention concerns novel intermediates for the production of biocidally active phosphoric acid amidohalides. The novel intermediates are of the formula:

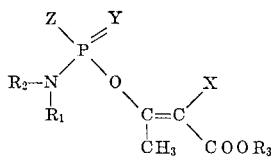

wherein
$R_1$ is hydrogen or lower alkyl of 1 to 3 carbon atoms,
$R_2$ and $R_3$ are lower alkyl of 1 to 5 carbon atoms,
X is hydrogen or chlorine,
Y is oxygen or sulphur, and
Z is chlorine or bromine.

---

This is a continuation-in-part of copending application Ser. No. 829,747, filed on June 2, 1969, now abandoned. The present invention relates to new phosphoric acid amidohalides of the Formula I,

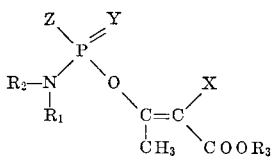    I wherein
$R_1$ is hydrogen or lower alkyl of 1 to 3 carbon atoms,
$R_2$ and $R_3$ are lower alkyl of 1 to 5 carbon atoms,
X is hydrogen or chlorine,
Y is oxygen or sulphur, and
Z is chlorine or bromine.

The compounds of Formula I are useful as intermediates in the production of biocidally active phosphoric acid esters. Processes for the production of the compounds also form part of the present invention.

In accordance with the processes of the invention a compound of the Formula I may be obtained by:
(a) reacting a phosphoric acid halide of Formula II,

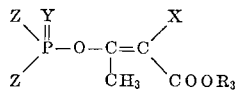    II wherein $R_3$, X, Y and Z have the above significance, with the equivalent amount of an amine of Formula III, $$R_1R_2NH \qquad III$$

wherein $R_1$ and $R_2$ have the above significance, in the presence of an acid acceptor, or (b) reacting a compound of Formula IV,

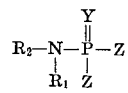    IV wherein $R_1$, $R_2$, Y and Z have the above significance, with a compound of Formula V,

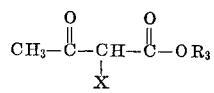    V wherein $R_3$ and X have the above significance, in the presence of an acid acceptor.

The production may be effected as follows:

In accordance with process (a) an equivalent amount of an amine of Formula III in the presence of an acid acceptor, e.g. triethylamine, trimethylamine, dimethyl aniline, diethyl aniline or sodium carbonate, is added at a temperature of −20° to +50° C., preferably at −10° to room temperature, to a compound of Formula II in a solvent which is inert under the reaction conditions, e.g. an aromatic hydrocarbon such as toluene or xylene, a halogenated hydrocarbon, e.g. chlorobenzene or chloroform, or dioxane, during the course of ½ to 2 hours. The precipitate which generally results is filtered off and the filtrate is washed with water. The solvent is subsequently removed in a vacuum at a bath temperature of approximately 20° to 50° C. The residue is subsequently distilled in a high vacuum or, in the case of compounds which cannot be distilled, is crystallized.

In accordance with an embodiment of process (a) it is possible to employ a second equivalent of an amine of Formula III as acid acceptor. In this reaction an aqueous solution of the amine of Formula III may be employed, and this is added to the compound of Formula II.

Process (a) may likewise be effected by reacting phosphorus oxychloride, phosphorus oxybromide, phosphorus thiochloride or phosphorus thiobromide with an acetoacetic ester of Formula V, in which $R_3$ and X have the above significance, in the presence of an acid acceptor and, without isolating the resulting compound of general Formula II, adding an equivalent amount of the compound of general Formula III, in the presence of an acid acceptor, to the reaction mixture.

In accordance with process (b) a compound of Formula V is added, generally at −10 to +50° C., to a compound of Formula IV, in an inert solvent, e.g. toluene or chlorobenzene, or optionally without solvent, and an acid acceptor, e.g. triethylamine, is added dropwise to the mixture. After working up in the usual manner, the described compounds are obtained.

The compounds of Formula I may be characterized in the usual manner by their physical constants. A predominant amount of the compound of Formula I obtained in accordance with the processes of the invention has a cis configuration in the crotonic acid radical, only a small amount having a trans configuration. The composition of the stereoisomeric forms of the compounds of Formula I may be determined in known manner employing a NMR spectrum.

The production of compounds of Formula II may be effected by reaction of a phosphorus oxychloride or oxybromide, or phosphorus thiochloride or thiobromide, with an acetoacetic ester of the above Formula V, in which $R_3$ signifies a lower alkyl radical containing 1 to 5 carbon atoms and X signifies a hydrogen or chlorine atom, in the presence of an acid acceptor.

The compounds of Formula I obtained in accordance with the processes of the invention may be used as intermediates for the production of valuable biocides, e.g.

insecticides. The processes of the invention open the possibility of producing the new compounds which may be used as intermediates in an economical and practical process.

Thus, for example, compounds of Formula I may be employed in the production of compounds of Formula VI,

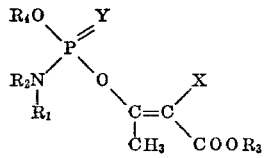

wherein $R_1$, $R_2$, $R_3$, X and Y have the above significance, and $R_4$ is an alkyl group of 1 to 5 carbon atoms.

The compounds VI are thus prepared by reaction of a compound I with an equivalent amount of an alcohol of Formula VII, $$R_4OH \qquad \qquad VII$$

wherein $R_4$ has the above significance, in the presence of an acid acceptor, such as described above.

The compounds VI, particularly those wherein the —$CH_3$ is cis to the —$COOR_3$, are useful insecticidal and acaracidal agents as indicated by their insecticidal effect against *Bruchidius obtectus* (bean weevil) *Alphis fabae* (black bean aphid) *Dysdercus fasciatus* sign (red bug) and *Aphis fabea* and their acaracidal effect against *Tetranychus telarius* (spider mite) in standard contact and systematic tests.

Compounds VI, wherein Y is oxygen are described in my said copending application Ser. No. 829,747, now abandoned. The compounds VI as above defined may be used as described in said application. Thus, combatting of insects and acarids can be carried out by treating the objects to be protected with the active agent, preferably in combination with an inert diluent or carrier. For use as a plant-protecting agent or as a pesticide a compound of Formula VI may be employed in the form of a dusting or spraying agent, e.g. as a solution or dispersion in water or a suitable organic solvent, e.g. alcohol, petroleum, tar distillates etc., and preferably in combination with an emulsifying agent, e.g. a liquid polyglycol ether derived from a high molecular weight alcohol, mercaptan or alkylphenol and an alkylene oxide. Suitable organic solvents, e.g. ketones, aromatic, optionally halogenated hydrocarbons, mineral oils etc., may also be added to the mixture as solution aids.

The spraying and dusting agents may contain the usual inert carrier materials, e.g. talc, diatomaceous earth, bentonite, pumice, cellulose derivatives and the like, and the usual adhesives and wetting agents to improve adhesiveness and wettability.

The active material may be present in the formulations as a mixture with other known active agents. Formulations suitable for use in the application of a compound of Formula VI to a locus generally contain between 0.01 and 90 percent, and preferably between 0.1 and 20% by weight of active agent depending upon the method of application. Concentrates suitably contain between about 2% and 90% and preferably between 5% and 50% by weight of active ingredient.

In the following non-limitative examples all temperatures are indicated in degrees centigrade.

EXAMPLE 1

Production of O-(1-methoxycarbonyl-1-propen-2-yl)-N-methyl-phosphoramido-chloridate (process a)

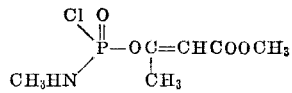

58.5 g. (0.25 mol) of O-(1-methoxycarbonyl)-1-propen-2-yl)-phosphoro-dichloridate are dissolved in 300 cc. of chlorobenzyl. A mixture of 7.8 g. (0.25 mol) of methylamine in 30 g. of chloroform and 25.5 g. (0.25 mole) of triethylamine as well as 100 cc. of chlorobenzene are added dropwise to this solution at 20° during the course of ½ hour.

After the addition is completed, the mixture is stirred for a further hour, the precipitated triethylamine hydrochloride is filtered off, the solvent is removed by evaporation and the resulting product is distilled at a pressure of $10^{-4}$ mm. of Hg. Redistillation yields pure O-(1-methoxycarbonyl-1-propen-2-yl) - N-methyl-phosphoramido-chloridate which has a boiling point of 95–97° at a pressure of $5.10^{-4}$ mm. of HG. It has a refractive index of $n_D^{20} = 1.482$.

*Analysis.*—Calcd. for $C_6H_{11}ClNO_4P$ (percent): Molecular weight, 227.6. C, 31.7; H, 4.9; Cl, 15.6; N, 6.2; P, 13.1, 13.6. Found (percent): C, 13.9; H, 5.2; Cl, 16.0; N, 6.0.

EXAMPLE 2

Production of O-(1-methoxycarbonyl-1-propen-2-yl)-N,N-diethyl-phosphoramido-chloridate (process a)

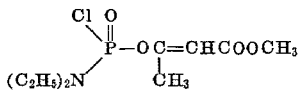

76.7 g. (0.5 mol) of $POCl_3$ are dissolved in 200 cc. of chlorobenzene. A mixture of 58.1 g. (0.5 mol) of acetoacetic acid methyl ester and 51 g. (0.5 mol) of triethylamine is added dropwise at —10° during the course of 15 minutes. After the addition is completed, the reaction mixture is stirred at 0° for ½ hour and at 20° for one hour. The reaction solution is subsequently diluted with 300 cc. of chlorobenzene, is cooled to —5° and 73.1 g. (1 mol) of diethylamine are added to the solution at —5° during the course of ½ hour. The solution is subsequently stirred at 0° for ½ hour and at 20° for 2 hours. The resulting precipitate is subsequently filtered off, the solvent is evaporated and the resulting product is distilled. The resulting O-(1-methoxycarbonyl-1-propen-2-yl) - N,N-diethyl - phosphoramidochloridate has a boiling point of 69–71° at a pressure of $5.10^{-4}$ mm. of Hg. It has a refractive index of $n_D^{20} = 1.473$.

*Analysis.*—Calcd. for $C_8H_{17}ClNO_4P$ (percent): Molecular weight, 269.7. C, 40.1; H, 6.4; Cl, 13.1; N, 5.2; P, 11.1, 11.5. Found (percent): C, 40.1; H, 6.7; Cl, 12.8; N, 4.9.

EXAMPLE 3

Production of O-(1-methoxycarbonyl-1-propen-2-yl)-N,N-diethyl-phosphoramido-chloridate (process b)

51 g. (0.5 mol) of triethylamine are added at +5° to a mixture of 95 g. (0.5 mol) of N,N-diethyl-phosphoramido-di-chloride and 58 g. (0.5 mol) of acetoacetic acid methyl ester during the course of ½ hour. The reaction mixture is stirred at 5° for one hour and at 20° for 15 hours. 500 cc. of toluene are subsequently added and the resulting precipitate is filtered off. The solvent is removed by evaporation and pure O-(1-methoxycarbonyl-1-propen-2-yl)-N,N - diethyl-phosphoramido-chloridate is obtained by distillation in a high vacuum.

The ratio cis:trans isomer (in the crotonic acid radical) amounts to 90:10 (determined by the NMR spectrum).

EXAMPLE 4

Production of O-(1-methoxycarbonyl-1-propen-2-yl)-N,N-diethtyl-phosphoramido - chloridothionate (process b)

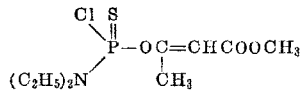

A mixture of 51.5 g. (0.25 mol) of N,N-diethyl-phosphoramido-thioate-dichloride and 29 g. (0.25 mol) of acetoacetic and acid methyl ester is added at 20° during the course of 3 hours to 25.5 g. (0.25 mol) of triethylamine. The reaction mixture is subsequently stirred at 20° for 10 hours and at 40° for 90 hours. The resulting precipitate is subsequently filtered off, the filtrate is washed with water and dried with magnesium sulphate. After distillation in a high vacuum pure O-(1-methoxycarbonyl-1-propen-2-yl)-N,N - diethyl - phosphoramido-chlorido-thionate, having a boiling point of 78–81° (5.10⁻³ mm. of Hg), is obtained. It has a refractive index of $n_D^{20} = 1.511$.

*Analysis.*—Calcd. for $C_9H_{17}ClNO_3PS$ (percent): Molecular weight, 285.7. C, 37.8; H, 6.0; Cl, 12.4; N, 4.8; P, 11.2; S, 10.7, 10.9, 11.2. Found (percent): C, 37.4; H, 5.9; Cl, 12.1; N, 4.6.

EXAMPLE 5

Production of O-(1-methoxycarbonyl-1-chloro-1-propen-2-yl)-N-n-propyl - phosphoramido - chlorido-thionate (process b)

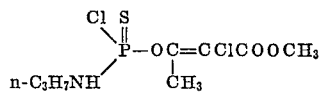

A mixture of 48 g. (0.25 mol) of N-n-propylphosphoramido-thioate-dichloride and 37.8 g. (0.25 mol) of α-chloro-acetoacetic acid methyl ester in 150 cc. of toluene is added to 25.5 g. of triethylamine at −5° during the course of one hour. The reaction solution is subsequently stirred at 0° for one hour and at 20° for 15 hours. The precipitated triethylamine hydrochloride is subsequently filtered off, the filtrate is washed with water, dried with sodium sulphate, the solvent is removed by evaporation and the residue is distilled. The resulting O-(1-methoxycarbonyl-1-chloro-1-propen-2-yl)-N-n - propyl - phosphoramido-chlorido-thionate has a boiling point of 108–110° at a pressure of 5.10⁻⁵ mm. of Hg. It has a refractive index of $n_D^{20} = 1.522$.

*Analysis.*—Calcd. for $C_8H_{14}Cl_2NO_3PS$ (percent): Molecular weight, 306.2. C, 31.4; H, 4.0; Cl, 23.2; N, 4.6; P, 10.4, 10.1; S, 10.8, 10.5. Found (percent): C, 31.0; H, 4.7; Cl, 23.4; N, 4.5.

EXAMPLE 6

Production of O-(1-ethoxycarbonyl-1-propen-2-yl)-N-n-propyl-phosphoramido-chlorido-thionate (process a)

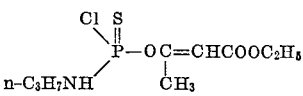

A solution of 131.5 g. (0.5 mol) of O-(1-ethoxycarbonyl-1-propen-2-yl)-phosphoro-dichlorido-thionate in 500 cc. of toluene is added at 0° during the course of one hour to a mixture of 29.6 g. (0.5 mol) of n-propyl amine and 51 g. (0.5 mol) of triethylamine. The reaction mixture is subsequently stirred at 0° for ½ hour and at 20° for one hour. The precipitated triethylamine hydrochloride is subsequently filtered off, the filtrate is washed with water, dried with $Na_2SO_4$ and distilled. The resulting O-(1-ethoxycarbonyl-1-propen-2-yl)-N-n - propyl - phosphoramido-chlorido-thionate has a boiling point of 92° at a pressure of 5.10⁻³ mm. of Hg. It has a refractive index of $n_D^{20} = 1.514$.

*Analysis.*—Calcd. for $C_9H_{17}ClNO_3PS$ (percent): Molecular weight, 285.7. C, 37.8; H, 6.0; Cl, 12.4; N, 4.9; P, 10.2, 10.8; S, 11.2, 11.2. Found (percent): C, 37.9; H, 5.8; Cl, 12.6; N, 5.2.

EXAMPLE 7

Production of O-(1-iso-propoxycarbonyl-1-propen-2-yl)-N-ethyl-phosphoramido-chlorido-thionate (process a, in the presence of water)

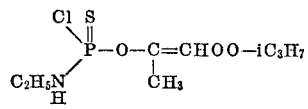

12.8 g. of a 70% solution of ethylamine in water (0.2 mol) are added dropwise at −3° to 27.7 g. (0.1 mol) of O-(iso-propoxycarbonyl-1-propen-2 - yl) - phosphoro - dichloridate during the course of 15 minutes while stirring. The mixture is stirred for a further 15 minutes, the oily product is separated, the residue is digested with water, dried and distilled in a high vacuum. O-(1-iso-propoxycarbonyl-1-propen-2-yl)-N-ethyl - phosphoramido - chlorido-thionate has a boiling point of 89°/5·10⁻³ mm. of Hg. It has a refractive index of $n_D^{20} = 1.5100$.

*Analysis.*—Calcd. for $C_9H_{17}ClNO_3PS$ (percent): Molecular weight, 285.7. C, 37.8; H, 6.0; Cl, 12.4; N, 5.1, 4.9; P, 10.8, 10.85; S, 11.2, 11.2. Found (percent): C, 37.7; H, 5.9; Cl, 12.7.

The compounds of general Formula I indicated in the Table are obtained in a manner analogous to that described in Examples 1 to 6. In Examples 8 to 17 the symbol Z signifies a chlorine atom.

| Ex. | R₁ | R₂ | R₃ | X | Y | Empirical formula | Molecular weight | B.P.(°C.)/mm. of Hg | $n_D^{20}$ | Calculated C | H | Cl | N | P | Found C | H | Cl | N | P |
|---|---|---|---|---|---|---|---|---|---|---|---|---|---|---|---|---|---|---|---|
| 8 | H | C₂H₅ | CH₃ | H | O | C₇H₁₃ClNO₄P | 241.6 | 106/5.10⁻⁴ | | 34.8 | 5.4 | 14.7 | 5.8 | 12.8 | 34.8 | 5.4 | 14.8 | 6.0 | 12.1 |
| 9 | H | iC₃H₇ | CH₃ | H | O | C₈H₁₅ClNO₄P | 255.6 | 102/4.10⁻⁴ | 1.476 | 37.6 | 5.9 | 13.9 | 5.5 | 12.1 | 37.3 | 5.8 | 14.3 | 5.7 | 11.5 |
| 10 | H | nC₃H₇ | C₂H₅ | H | O | C₉H₁₇ClNO₄P | 269.7 | 116/0.07 | 1.475 | 40.1 | 6.4 | 13.1 | 5.2 | 11.5 | 39.9 | 6.5 | 13.6 | 5.3 | 10.8 |
| 11 | H | nC₃H₇ | iC₃H₇ | H | O | C₁₀H₁₉ClNO₄P | 283.7 | (¹) | 1.473 | 42.3 | 6.8 | 12.5 | 4.9 | 10.0 | 41.7 | 7.0 | 13.2 | 4.8 | 9.9 |
| 12 | CH₃ | CH₃ | CH₃ | H | O | C₇H₁₃ClNPO₄P | 241.6 | 95/0.1 | 1.474 | 34.8 | 5.4 | 14.7 | 5.8 | 12.8 | 35.1 | 5.1 | 13.9 | 6.2 | 12.2 |
| 13 | C₂H₅ | C₂H₅ | C₂H₅ | H | O | C₁₀H₁₉ClNO₄P | 283.7 | 114/0.04 | 1.470 | 42.5 | 6.8 | 12.5 | 4.9 | 10.9 | 43.0 | 7.1 | 12.7 | 4.5 | 10.3 |
| 14 | H | C₂H₅ | nC₃H₇ | Cl | O | C₉H₁₆Cl₂NO₄P | 304.1 | 108–12/5.10⁻³ | 1.486 | 35.5 | 5.3 | 23.3 | 4.6 | 10.2 | 36.0 | 5.6 | 23.2 | 4.8 | 9.8 |
| 15 | H | C₂H₅ | iC₃H₇ | Cl | O | C₉H₁₆Cl₂NO₄P | 304.1 | 115/1.10⁻³ | 1.489 | 35.5 | 5.3 | 23.3 | 4.6 | 10.2 | 35.1 | 5.0 | 23.9 | 5.0 | 10.2 |
| 16 | H | nC₃H₇ | nC₃H₇ | Cl | O | C₁₀H₁₈Cl₂NO₄P | 318.1 | 120–2/0.01 | 1.485 | 37.8 | 5.7 | 22.3 | 4.4 | 9.7 | 37.2 | 5.4 | 22.1 | 4.7 | 9.4 |
| 17 | H | nC₃H₇ | C₂H₅ | Cl | S | C₉H₁₆Cl₂NO₃PS | 320.2 | 96–7/5.10⁻³ | 1.525 | 33.8 | 5.0 | 22.1 | 4.4 | 9.7 | 33.8 | 5.1 | 22.5 | 4.0 | 9.9 |

What is claimed is:

1. A phosphoric acid amidohalide of the formula:

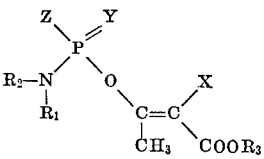

wherein

R₁ is hydrogen or lower alkyl of 1 to 3 carbon atoms,
R₂ and R₃ are lower alkyl of 1 to 5 carbon atoms,
X is hydrogen or chlorine,
Y is oxygen or sulphur, and
Z is chlorine or bromine.

2. The compound of claim 1, which is
   O - (1-methoxycarbonyl-1-propen-2-yl)-N-methylphosphoramido-chloridate.

3. The compound of claim 1, which is
   O-(1-methoxycarbonyl - 1 - propen-2-yl)-N,N-diethyl-phosphoramido-chloridate.

4. The compound of claim 1, which is
   O-(1-methoxycarbonyl - 1 - propen-2-yl)-N,N-diethyl-phosphoramido-chlorido-thionate.

5. The compound of claim 1, which is O-(1-methoxycarbonyl - 1 - chloro-1-propen-2-yl)-N-n-propyl-phosphoramido-chlorido-thionate.

6. The compound of claim 1, which is O-(1-ethoxycarbonyl - 1 - propen - 2 - yl)-N-n-propyl-phosphoramido-chlorido-thionate.

7. The compound of claim 1, which is O-(1-isopropoxycarbonyl - 1 - propen - 2 - yl)-N-ethyl-phosphoramido-chlorido-thionate.

8. The compound of claim 1, wherein $R_1$ is hydrogen, $R_2$ is ethyl, $R_3$ is methyl, X is hydrogen, and Y is oxygen.

9. The compound of claim 1, wherein $R_1$ is hydrogen, $R_2$ is i-propyl, $R_3$ is methyl, X is hydrogen, and Y is oxygen.

10. The compound of claim 1, wherein $R_1$ is hydrogen, $R_2$ is n-propyl, $R_3$ is ethyl, X is hydrogen, and Y is oxygen.

11. The compound of claim 1, wherein $R_1$ is hydrogen, $R_2$ is n-propyl, $R_3$ is i-propyl, X is hydrogen, and Y is oxygen.

12. The compound of claim 1, wherein $R_1$ is methyl, $R_2$ is methyl, $R_3$ is methyl, X is hydrogen, and Y is oxygen.

13. The compound of claim 1, wherein $R_1$ is ethyl, $R_2$ is ethyl, $R_3$ is ethyl, X is hydrogen, and Y is oxygen.

14. The compound of claim 1, wherein $R_1$ is hydrogen, $R_2$ is ethyl, $R_3$ is n-propyl, X is chlorine, and Y is oxygen.

15. The compound of claim 1, wherein $R_1$ is hydrogen, $R_2$ is ethyl, $R_3$ is i-propyl, X is chlorine, and Y is oxygen.

16. The compound of claim 1, wherein $R_1$ is hydrogen, $R_2$ is n-propyl, $R_3$ is n-propyl, X is chlorine, and Y is oxygen.

17. The compound of claim 1, wherein $R_1$ is hydrogen, $R_2$ is n-propyl, $R_3$ is ethyl, X is chlorine, and Y is sulphur.

References Cited
UNITED STATES PATENTS 3,366,715   1/1968   Morales _____ 260—941

JOSEPH REBOLD, Primary Examiner

R. L. RAYMOND, Assistant Examiner

U.S. Cl. X.R.

260—972, 973, 984; 424—212

UNITED STATES PATENT OFFICE
CERTIFICATE OF CORRECTION

Patent No. 3,649,719     Dated March 14, 1972

Inventor(s) JEAN PIERRE LEBER

It is certified that error appears in the above-identified patent and that said Letters Patent are hereby corrected as shown below:

Column 1 line 16 and 17 - delete the word "amidohalides" and insert therefor --esters--.

Column 7 and Column 8 - claims 8 - 17
insert -- Z is chlorine -- before the word "and".

Signed and sealed this 1st day of January 1974.

(SEAL)
Attest:

EDWARD M. FLETCHER, JR.
Attesting Officer

RENE D. TEGTMEYER
Acting Commissioner of Patents